United States Patent [19]

Hinch et al.

[11] Patent Number: 4,769,815

[45] Date of Patent: Sep. 6, 1988

[54] PACKET FLOW CONTROL METHOD

[75] Inventors: Mark G. Hinch, Wheaton; John B. Reid, Naperville, both of Ill.; William C. Wiberg, Red Bank, N.J.

[73] Assignee: American Telephone and Telegraph Company, AT&T Bell Laboratories, Murray Hill, N.J.

[21] Appl. No.: 36,940

[22] Filed: Apr. 10, 1987

[51] Int. Cl.$^4$ .............................................. H04J 3/24
[52] U.S. Cl. .................................................. 370/94
[58] Field of Search ...................... 370/82, 83, 94, 60, 370/79

[56] References Cited

U.S. PATENT DOCUMENTS

| | | | |
|---|---|---|---|
| 4,074,232 | 2/1978 | Otomo et al. | 340/147 |
| 4,079,209 | 3/1978 | Schwerdtel | 179/18 |
| 4,317,195 | 2/1982 | Barberis et al. | 370/94 |
| 4,320,500 | 3/1982 | Barberis et al. | 370/60 |
| 4,380,063 | 4/1983 | Janson et al. | 370/60 |
| 4,399,531 | 8/1983 | Grande et al. | 370/60 |
| 4,475,192 | 10/1984 | Fernow et al. | 370/94 |
| 4,506,358 | 3/1985 | Montgomery et al. | 370/60 |
| 4,527,267 | 7/1985 | Cohen | 370/60 |
| 4,569,042 | 2/1986 | Larson | 370/13 |
| 4,616,359 | 10/1986 | Fontenot | 370/60 |
| 4,617,657 | 10/1986 | Drynan et al. | 370/60 |
| 4,677,616 | 6/1987 | Franklin | 370/94 |
| 4,692,860 | 9/1987 | Andersen | 370/94 |

FOREIGN PATENT DOCUMENTS 60-241349  11/1985  Japan .

OTHER PUBLICATIONS

D. Belsnes, "Flow Control in the Packet Switching Networks", *Communications Networks*, Uxbridge, England: Online, pp. 349-361, 1975.
G. L. Fultz et al., "Adaptive Routing Techniques for Store-and-Forward Computer-Communication Networks", *ICC-International Conference on Communications*, 14-16 Jun. 1971, pp. 39-1-39-8.
G. Bockle, "Simulation and Performance Analysis of an X.25 Network", National Telecommunications Conference, Nov. 27-29, 1979, pp. 3.3.1-3.3.7.
M. Gerla et al., "Flow Control: A Comparative Survey", 8029 *IEEE Trans. on Communications*, vol. Com-28 (1980) Apr., No. 4, pp. 553-574.
A. S. Tanenbaum, "Flow Control and Buffering", *Computer Networks* 1981 Prentice-Hall, Chap. 8, pp. 338-343.
L. Pouzin, "Methods, Tools, and Observations on Flow Control in Packet-Switched Data Networks", *IEEE Trans. on Communications*, vol. Com-29, No. 4, Apr. 1981.
H. Anderson, et al. "Flow-Balancing Congestion Control for Computer Networks", *IBM Technical Disclosure Bulletin*, vol. 25 No. 1, Jun. 1982, pp. 174-178.

*Primary Examiner*—Douglas W. Olms
*Assistant Examiner*—Wellington Chin
*Attorney, Agent, or Firm*—Ross T. Watland

[57] ABSTRACT

A packet flow control method where delay data are added into an initial packet as it traverses a packet switching network, and where the receiver of the initial packet, rather than the sender, establishes a window size based on such delay data to be used for the duration of a packet connection through the network. The delay data allow for the calculation of an average rather than an instantaneous network delay such that the flow control mechanism is not dependent on the magnitude of network congestion that happens to be present when the connection is first established. Since the receiver determines the window size, the flow control mechanism is put in place as an integral part of the initial packet exchange used to establish the two-way packet connection rather than requiring an additional packet communication to the receiver after a window size calculation by the sender.

25 Claims, 2 Drawing Sheets

PACKET HEADER FORMAT

PACKET FLOW CONTROL METHOD

BACKGROUND AND PROBLEM

In packet switching networks, it is frequently important to effect end-to-end packet flow control so that a high data throughput rate is achieved without overloading the network. In one flow control scheme known as end-to-end windowing, the packets of a data stream are numbered sequentially. A window, described by left and right edges, restricts the sequence numbers of packets that the sender may transmit at any given instant. The receiver responds to received packets with positive acknowledgements which cause the sender's window to move ahead.

In the windowing scheme described in an article by D. Belnes, "Flow Control in the Packet Switching Networks," *Communications Networks,* Uxbridge, England, pages 349-361, 1975, the sender establishes the window size. The sender begins transmitting packets into the network at a high rate and sets the window size equal to the number of packets outstanding at the instant the first positive acknowledgement is received. In effect, what is done is that the sender makes an instantaneous measurement of round-trip delay and adjusts the window accordingly. Although it is possible to make frequent adjustments in the window size as the round-trip delay varies, for example, due to network congestion, such adjustments represent processing overhead. It is therefore desirable in many applications to set the window once as a packet connection is being established and then leave the window unchanged for the duration of the connection. In such applications, the Belnes scheme is undesirable since a larger window size is set if the connection happens to be established at a time when the network is unusually congested such that the measured round-trip delay is long. While a large window increases throughput, it operates to further aggravate the congestion by allowing a larger number of packets to be in transit through the network.

In view of the foregoing, a recognized problem in the art is the unsuitability of end-to-end windowing arrangements where the sender determines the window size based on instantaneous network delay characteristics.

Solution

The foregoing problem is solved and a technical advance is achieved in accordance with the principles of the invention in a flow control method where delay data are advantageously added into an initial packet as it traverses a packet switching network, and where the receiver of the initial packet, rather than the sender, establishes a window size based on such delay data to be used for the duration of a packet connection through the network. Advantageously, the delay data allow for the calculation of an average rather than an instantaneous network delay such that the flow control mechanism is not dependent on the magnitude of network congestion that happens to be present when the connection is first established. Since the receiver determines the window size, the flow control mechanism is put in place as an integral part of the initial packet exchange used to establish the two-way packet connection rather than requiring an additional packet communication to the receiver after a window size calculation by the sender.

A method of controlling packet flow in accordance with the invention is used in a packet switching arrangement comprising a number of packet switching nodes. To establish a packet connection between first and second nodes, a first packet is transmitted from the first node to the second node via intermediate nodes. As the packet traverses the network, ones of the nodes add delay data into the packet. When the second node receives the packet, it determines a window size for use over the connection based on the delay data added into the packet. The window size comprises a number, N, of packets. After the window size determination, the second node transmits packets to the first node over the connection such that, at any given time, no more than N packets transmitted by the second node are unacknowledged by the first node.

In one exemplary method, one of the packets transmitted by the second node defines the number, N, and the first node thereafter transmits packets to the second node over the connection such that, at any given time, no more than N packets transmitted by the first node are unacknowledged by the second node. The initial packet transmitted by the first node includes a terrestrial hop count field and a satellite hop count field and the step of adding delay data into that packet comprises incrementing one of the hop count fields. The window size is derived by the second node as a function of a number, $Ht$, of terrestrial hops defined by the terrestrial hop count field and a number, $Hs$, of satellite hops defined by the satellite hop count field.

The derivation is performed by obtaining values of a set of parameters ($tc$, $ps$, $csd$, $qd$, $id$, $tpd$, $spd$), where $tc$ is a throughput class, $ps$ is a packet size, $csd$ is a cross switch delay, $qd$ is a queuing delay, $id$ is an insertion delay, $tpd$ is a terrestrial propagation delay, and $spd$ is a satellite propagation delay. The second node communicates with terminal equipment coupled thereto to determine the parameters $tc$ and $ps$. The other parameters are obtained by reading a memory of the second node. The window size, N, is then determined based on a value of an expression: $(2*D*tc/ps)$, where $D=(Ht+Hs+1)(csd)+Ht(qd+id+tpd)+Hs(qd+id+spd)$. The determination includes rounding the value of the expression to an integer.

In other exemplary methods herein, the delay across a nonhomogeneous network made up, for example, of nodes comprising switches of different manufacturers or transmission links of various lengths, rather than being based solely on uniform delay parameters and the number of hops involved in a particular packet connection, is instead based on delay components added into the packet delay field that are specific to the nodes and links that comprise that packet connection.

DRAWING DESCRIPTION

FIG. 1 is a diagram of a portion of an illustrative packet switching network where the flow control method of the present invention is implemented; and FIG. 2 is a diagram showing the fields of a packet header used for packets transmitted internal to the network of FIG. 1.

DETAILED DESCRIPTION

Figure 1:
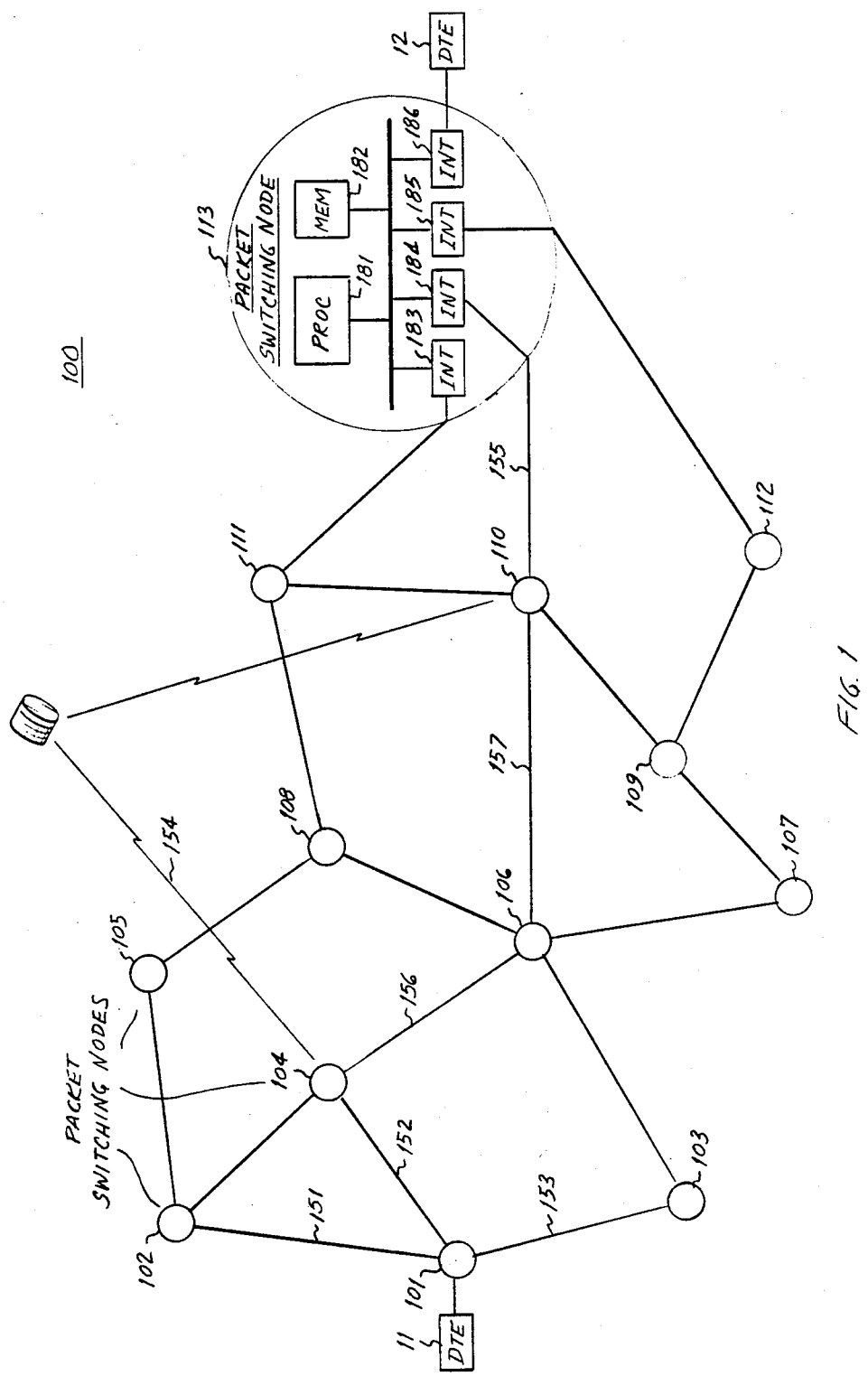

Examples of packet switching networks such as network 100 (FIG. 1) are the ARPANET network of the U.S. Department of Defense, the network disclosed in U.S. Pat. No. 4,506,358 of W. A. Montgomery, issued Mar. 19, 1985, and a network comprised of multiple, integrated packet switching and circuit switching systems such as the system disclosed in U.S. Pat. No. 4,592,048 of M. W. Beckner et al., issued May 27, 1986. The invention is applicable in networks comprising many telephone switching offices, and specifically in an integrated services digital network (ISDN). An ISDN is defined as a network evolved from the telephony integrated digital network that provides end-to-end digital connectivity to support a wide range of services, including voice and non-voice services, to which users have access by a limited set of standard multipurpose customer interfaces. The portion of network 100 shown in FIG. 1 comprises a plurality of packet switching nodes 101 through 113, and bidirectional, interconnecting links comprising terrestrial links, such as links 151, 152, and 153 emanating from node 101, and a satellite link 154 between nodes 104 and 110. Each node includes a processor, a memory, and interface facilities to adjacent nodes or to data terminal equipment (DTE) served by network 100. For example, node 113 includes processor 181, memory 182, interface facilities 183, 184, and 185 to nodes 111, 110, and 112, respectively, and interface facility 186 to DTE 12.

Figure 2:
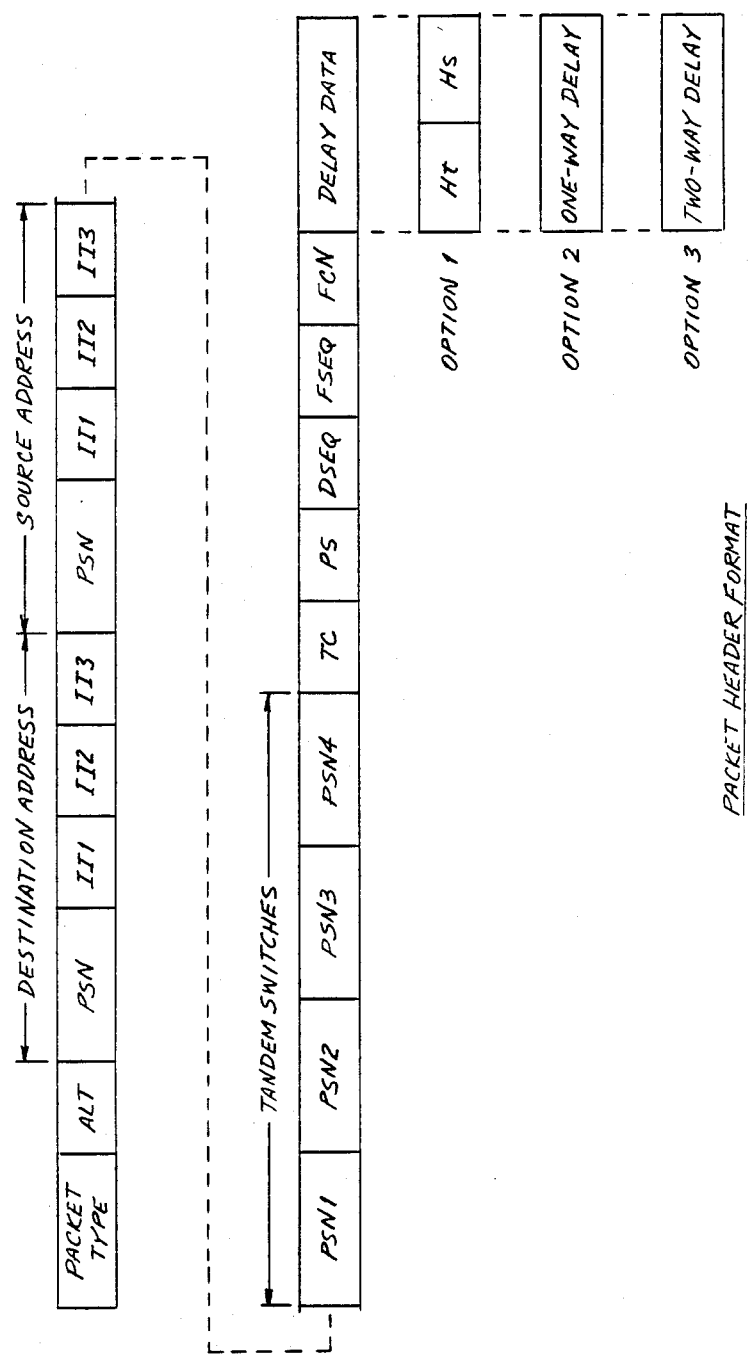

Packet communication between a given DTE and network 100 is effected in accordance with a known communication protocol, for example the CCITT standard protocol X.25. Within network 100, an additional packet header shown in FIG. 2 is added to the X.25 packets. The packet header includes the following fields:

(1) The PACKET TYPE field defines the packet as one of a number of predefined types. Examples of such packet types include the following: call request, call accept, permanent virtual circuit (PVC) setup, PVC accept, receiver ready (RR), receiver not ready (RNR), data, interrupt, interrupt confirm, reset, clear, reset confirm, reject, reconnect request, reconnect confirm, etc.

(2) The ALT field defines whether the packet is being transmitted over a primary or alternate route through network 100.

(3) The destination address is specified by PSN, II1, II2, and II3 fields. The PSN field specifies a packet switch number defining the packet switching node serving the destination DTE. The II1, II2, and II3 fields collectively define the particular destination interface of that packet switching node.

(4) The source address is similarly specified by PSN, II1, II2, and II3 fields.

(5) The PSN1, PSN2, PSN3, and PSN4 fields define the packet switch numbers of the tandem switches or intermediate packet switching nodes used for a particular packet connection through network 100.

(6) The TC and PS fields specify the throughput class and maximum packet size used over the particular packet connection.

(7) The DSEQ, FSEQ, and FCN fields are flow control fields. Each data packet transmitted for each direction of transmission includes a data sequence number (DSEQ) and a flow control sequence number (FSEQ). The data sequence numbering scheme of the packets is performed modulo 128 with the data packet sequence numbers cycling through the entire range of 0 to 127. The flow sequence numbering scheme of the packets is performed modulo 8 with the flow packet sequence numbers cycling through the entire range of 0 through 7. Each acknowledgment, in the form of a data, RR, or RNR packet, carries a flow credit number (FCN) used to authorize data packets to cross network 100.

(8) The DELAY DATA field specifies data relevant to the cross-network delay for determining the window size used for packet flow control across the particular packet connection as discussed in detail herein.

When a packet connection is being established across network 100, the network route is initially unknown. Therefore, in the header added to the initial packet transmitted across network 100, the tandem switch fields PSN1, PSN2, PSN3, and PSN4 are empty. For example, if a virtual call between DTE 11 and DTE 12 is being established, a call request packet is transmitted from node 101 with the destination address section of the packet header completed but with the tandem switch fields empty. The TC and PS header fields define a proposed throughput class and packet size for the connection. Node 101 executes a local routing program to determine the next node to be used for the connection based on the destination address. Node 101 may determine, for example, that the connection should be established via terrestrial link 152 to intermediate node 104. Once the routing determination is made, node 101 adds the address of intermediate node 104 into the PSN1 field of the packet header. Node 101 also sets a terrestrial hop count subfield Ht in the delay data field of the packet header (FIG. 2, option 1) to one, and transmits the call request packet via link 152 to node 104. In response to the call request packet, node 104 executes a local routing program and determines, for example, that the connection should be continued via satellite link 154 to intermediate node 110. Node 104 adds the address of intermediate node 110 into the PSN2 field of the packet header, sets a satellite hop count subfield Hs in the delay data field to one, and transmits the call request packet via link 154 to node 110. In response to the call request packet, node 110 executes a local routing program and determines that the connection is continued via a terrestrial link 155 to destination node 113. Node 110 increments the terrestrial hop count subfield Ht by one such that Ht=2 and transmits the call request packet via link 155 to node 113. In response to the call request packet, node 113 obtains values of a set of parameters (tc, ps, csd, qd, id, tpd, spd), where tc is a throughput class, ps is a packet size, csd is a cross switch delay, qd is a queuing delay, id is an insertion delay, tpd is a terrestrial propagation delay, and spd is a satellite propagation delay. The parameters csd, qd, id, tpd, and spd are static parameters which node 113 stores in memory 182. The parameters tc and ps are determined by negotiation during an exchange of X.25 packets between node 113 and DTE 12. Assume for example that the TC and PS fields of the call request packet received by node 113 specify a throughput class of 19.2 kilobits per second and a packet size of 128 bytes. DTE 12 is allowed to either accept or reduce the proposed throughput class and packet size. In the present example, DTE 12 may reduce the throughput class to 4800 bits per second and accept the packet size of 128 bytes.

The parameters csd, qd, id, tpd, and spd are average delays determined prior to system initialization either by measurement, analytical calculation or some other estimation procedure. The cross switch delay, csd, is defined as the time between the receipt of the initial bit of a packet and the time the packet is placed in a node output queue for transmission on an outgoing link. The queuing delay, qd, is defined as the time that the packet remains in the output queue awaiting transmission. The insertion delay, id, is defined as the time between the transmission of the first bit of the packet on the outgoing link and the transmission of the last bit. The propagation delays, tpd and spd, are defined as the times required for information to be transmitted across terrestrial and satellite links, respectively. In the present example, it is assumed that the delay characteristics of the nodes and links are substantially uniform throughout network 100 and are given as indicated in Table 1.

TABLE 1

| PARAMETER | VALUE (SECONDS) |
|---|---|
| csd | 0.040 |
| qd | 0.040 |
| id | 0.020 |
| tpd | 0.010 |
| spd | 0.250 |

Once node 113 has obtained values of the set of parameters (tc, ps, csd, qd, id, tpd, spd), node 113 calculates the cross-network delay, D, according to:

$$D = (Ht + Hs + 1)(csd) + Ht(qd + id + tpd) + Hs(qd + id + spd). \quad (1)$$

The delay terms are in seconds. In the present example, $D = (2 + 1 + 1)(0.040) + 2(0.040 + 0.020 + 0.010) + (0.040 + 0.020 + 0.250) = 0.610$ seconds. Node 113 then calculates the window size, given by N, a number of packets, according to:

$$N = \lceil 2 \cdot D \cdot tc / ps \rceil, \quad (2)$$

where [x] is the smallest integer not less than x, D is in seconds, tc is in bits per second, and ps is in bits. In the present example, $N = \lceil 2 \cdot (0.610) \cdot (4800)/(128 \cdot 8) \rceil = \lceil 5.7 \rceil = 6$ packets. (Alternatively, N may be determined by rounding the value of the expression to the nearest positive integer or to the next lower positive integer.) Node 113 then transmits a call accept packet to node 101 via the reverse route through network 100. In contrast to the call request packet, the call accept packet and all data packets transmitted during the call specify the intermediate nodes in the tandem switch fields PSN1, PSN2, PSN3, and PSN4 of the packet header. The window size $N = 6$ is defined in the DSEQ field of the call accept packet. The window size is used to control packet flow in both directions for the duration of the call between DTE 11 and DTE 12. Node 113 transmits packets to node 101 such that, at any given time, no more than six packets transmitted by node 113 are unacknowledged by node 101. Similarly, node 101 transmits packets to node 110 such that, at any given time, no more than six packets transmitted by node 101 are unacknowledged by node 113.

A similar procedure is used to establish a permanent virtual circuit between nodes 101 and 113 except that rather than transmitting call request and call accept packets, PVC setup and PVC accept packets are exchanged. It should be noted that the window size established by the above-described procedure is the internal window size for network 100 and is independent of external window sizes that may be established for the X.25 packet communications between DTE 11 and network 100 and between DTE 12 and network 100.

Tables 2 through 5 give window sizes calculated using equations (1) and (2). Note that the window size is not allowed to exceed seven.

TABLE 2

Window Size (HS = 0, ps = 128 bytes)

| Ht | tc, bits per second | | | | | | | | | |
|---|---|---|---|---|---|---|---|---|---|---|
| | 75 | 150 | 300 | 600 | 1200 | 2400 | 4800 | 9600 | 19.2k | 48k |
| 0 | 1 | 1 | 1 | 1 | 1 | 1 | 1 | 1 | 2 | 4 |
| 1 | 1 | 1 | 1 | 1 | 1 | 1 | 2 | 3 | 6 | 7 |
| 2 | 1 | 1 | 1 | 1 | 1 | 2 | 3 | 5 | 7 | 7 |
| 3 | 1 | 1 | 1 | 1 | 1 | 2 | 4 | 7 | 7 | 7 |
| 4 | 1 | 1 | 1 | 1 | 2 | 3 | 5 | 7 | 7 | 7 |
| 5 | 1 | 1 | 1 | 1 | 2 | 3 | 6 | 7 | 7 | 7 |

TABLE 3

Window Size (HS = 0, ps = 256 bytes)

| Ht | tc, bits per second | | | | | | | | | |
|---|---|---|---|---|---|---|---|---|---|---|
| | 75 | 150 | 300 | 600 | 1200 | 2400 | 4800 | 9600 | 19.2k | 48k |
| 0 | 1 | 1 | 1 | 1 | 1 | 1 | 1 | 1 | 1 | 2 |
| 1 | 1 | 1 | 1 | 1 | 1 | 1 | 1 | 2 | 3 | 7 |
| 2 | 1 | 1 | 1 | 1 | 1 | 1 | 2 | 3 | 5 | 7 |
| 3 | 1 | 1 | 1 | 1 | 1 | 1 | 2 | 4 | 7 | 7 |
| 4 | 1 | 1 | 1 | 1 | 1 | 2 | 3 | 5 | 7 | 7 |
| 5 | 1 | 1 | 1 | 1 | 1 | 2 | 3 | 6 | 7 | 7 |

TABLE 4

Window Size (HS = 1, ps = 128 bytes)

| Ht | tc, bits per second | | | | | | | | | |
|---|---|---|---|---|---|---|---|---|---|---|
| | 75 | 150 | 300 | 600 | 1200 | 2400 | 4800 | 9600 | 19.2k | 48k |
| 0 | 1 | 1 | 1 | 1 | 1 | 2 | 4 | 7 | 7 | 7 |
| 1 | 1 | 1 | 1 | 1 | 2 | 3 | 5 | 7 | 7 | 7 |
| 2 | 1 | 1 | 1 | 1 | 2 | 3 | 6 | 7 | 7 | 7 |
| 3 | 1 | 1 | 1 | 1 | 2 | 4 | 7 | 7 | 7 | 7 |
| 4 | 1 | 1 | 1 | 1 | 2 | 4 | 7 | 7 | 7 | 7 |

TABLE 5

Window Size (HS = 1, ps = 256 bytes)

| Ht | tc, bits per second | | | | | | | | | |
|---|---|---|---|---|---|---|---|---|---|---|
| | 75 | 150 | 300 | 600 | 1200 | 2400 | 4800 | 9600 | 19.2k | 48k |
| 0 | 1 | 1 | 1 | 1 | 1 | 1 | 2 | 4 | 7 | 7 |
| 1 | 1 | 1 | 1 | 1 | 1 | 2 | 3 | 5 | 7 | 7 |
| 2 | 1 | 1 | 1 | 1 | 1 | 2 | 3 | 6 | 7 | 7 |
| 3 | 1 | 1 | 1 | 1 | 1 | 2 | 4 | 7 | 7 | 7 |
| 4 | 1 | 1 | 1 | 1 | 1 | 2 | 4 | 7 | 7 | 7 |

In the previous example, the delay characteristics of the nodes and links were assumed to be uniform throughout network 100. In an alternative embodiment, each node transmitting a call request packet adds a one-way delay component into the packet header (FIG. 2, option 2). Consider the same packet connection established in the previous example, via nodes 101, 104, 110, and 113. The characteristics of node 101 and link 152 are, for example, such that the cross switch delay is 0.040 seconds, the queuing delay is 0.040 seconds, the insertion delay is 0.020 seconds, and the terrestrial propagation delay on link 152 is 0.010 seconds. Node 101 adds a one-way delay component of 0.110 seconds into a one-way delay field of the packet header. Node 104, however, is a switching system of a different manufacturer and the relevant parameters are a cross switch delay of 0.060 seconds, a queuing delay of 0.035 seconds, an insertion delay of 0.015 seconds, and a satellite propagation delay on link 154 of 0.250 seconds. Node 104 therefore adds a one-way delay component of 0.360 seconds to the previous value of 0.110 seconds and stores the cumulative one-way delay of 0.470 seconds in the packet header. Node 110 has a cross switch delay of 0.050 seconds, a queuing delay of 0.040 seconds, an insertion delay of 0.030 seconds, and a terrestrial propagation delay on link 155 of 0.020 seconds (link 155 may, for example, be twice as long as link 152). Node 110 adds a one-way delay component of 0.140 seconds to the previous value of 0.470 seconds and stores the cumulative one-way delay of 0.610 seconds in the packet header. Since the window being established is for the internal packet connection through network 100 and not for the external connection between network 100 and DTE 12, the delay component added in by node 113 comprises only a cross switch delay, for example, of 0.060 seconds. The total one-way delay is therefore 0.670 seconds. Assuming the same throughput class and packet size as before, the window size calculated using equation (2) is N=7 packets.

In another alternative embodiment, each node transmitting a call request packet adds a two-way delay component into the packet header (FIG. 2, option 3). For example, the delay component added in by node 110 may include a cross switch delay of 0.050 seconds, a queuing delay of 0.040 seconds, an insertion delay of 0.030 seconds, and a terrestrial propagation delay of 0.020 seconds for one direction of transmission and a cross switch delay of 0.050 seconds, a queuing delay of 0.035 seconds, an insertion delay of 0.030 seconds, and a satellite propagation delay of 0.250 seconds for the other direction of transmission. The two-way delay component added into the call request packet by node 110 is therefore 0.505 seconds. Of course, node 113 adds in insertion, queuing, and propagation delays only for the transmission from node 113 to node 110 and not for the transmission from node 113 to DTE 12. Similarly, node 101 adds in insertion, queuing, and propagation delays only for the transmission from node 101 to node 104 and not for the transmission from node 101 to DTE 11. (Nodes 113 and 101 each add in cross switch delays for both directions of transmission.) Node 113 uses the total two-way delay, D, to compute the window size in accordance with $$N=[D*tc/ps]. \quad (3)$$

Once a packet connection is established for a virtual call between DTE 11 and DTE 12, as in the above-discussed example via nodes 101, 104, 110 and 113, a failure of a node or link or excessive network congestion may be detected by node 101 either by receiving a failure packet from one of the nodes or by experiencing substantially reduced throughput. Node 101 may then formulate a reconnect request packet to change the packet connection through network 100 without DTE 11 and DTE 12 even becoming aware of the changed connection. The reconnect request packet has the same general format as the call request packet discussed above. The tandem switch fields PSN1, PSN2, PSN3, and PSN4 are not filled in initially. The routing program executed by node 101 determines, for example, that link 152 is the primary route and links 151 and 153 are alternate routes. The first choice for routing the new connection is via one of the alternate routes. If one of the alternate routes is selected, the ALT field of the reconnect request packet header is set accordingly. Only if the alternate routes are unavailable is the connection established again via the primary route. Assume for the present example, that links 151 and 153 are unavailable. The reconnect request packet is routed via the primary route of link 152. The address of node 104 is added into the tandem switch field PSN1 of the packet header. The delay data is added into the delay data field in accordance with the particular option (FIG. 2) that is being used. Node 104 determines that the alternate route via link 156 to node 106 is presently available, adds the node 104 address in the tandem switch field PSN2 and the delay data into the delay data field, and transmits the reconnect request packet via link 156 to node 106. The process continues and the reconnect request packet is further transmitted via link 157 to node 110, and via link 155 to node 113. In response to the reconnect request packet, node 113 calculates the window size for the changed packet connection based on the delay data field of the reconnect request packet. The window size is, for example, reduced due to the removal of the satellite link from the packet connection even though one additional node is included. The new window size is returned in a reconnect confirm packet via the reverse route through network 100 to node 101.

What is claimed is:

1. In a packet switching arrangement comprising a plurality of packet switching nodes, a method of controlling packet flow comprising transmitting a first packet from a first one of said nodes to a second one of said nodes via intermediate ones of said nodes to establish a packet connection between said first node and said second node, ones of said first, intermediate, and second nodes adding delay data into said first packet, in response to a receipt of said first packet, said second node determining a window size for use over said connection based on said delay data added into said first packet, said determined window size comprising a number, N, of packets, and after said determining step, said second node transmitting packets to said first node over said connection such that, at any given time, no more than N packets transmitted by said second node are unacknowledged by said first node.

2. A method in accordance with claim 1 wherein said first packet includes a hop count field, wherein said adding step comprises incrementing said hop count field, and wherein said determining step comprises deriving said window size as a function of a number, H, of hops defined by said hop count field.

3. A method in accordance with claim 2 wherein said deriving step comprises obtaining values of a set of parameters (tc, ps, csd, qd, id, pd), where tc is a throughput class, ps is a packet size, csd is a cross switch delay, qd is a queuing delay, id is an insertion delay, and pd is a propagation delay, and determining said number, N, based on a value of an expression:

(2*D*tc/ps), where $D=(H+1)(csd)+H(qd+id+pd)$.

4. A method in accordance with claim 3 wherein said obtaining step comprises said second node determining said parameters tc and ps by communicating with terminal equipment coupled to said second node, and said second node determining said parameters csd, qd, id, and pd by reading a memory of said second node.

5. A method in accordance with claim 1 wherein one of said packets transmitted to said first node by said second node defines said number, N, said method further comprising after a receipt of said packet defining said number, N, said first node transmitting packets to said second node over said connection such that, at any given time, no more than N packets transmitted by said first node are unacknowledged by said second node.

6. A method in accordance with claim 1 wherein said first packet includes a terrestrial hop count field and a satellite hop count field, wherein said adding step comprises incrementing one of said hop count fields, and wherein said determining step comprises deriving said window size as a function of a number, Ht, of terrestrial hops defined by said terrestrial hop count field and a number, Hs, of satellite hops defined by said satellite hop count field.

7. A method in accordance with claim 6 wherein said deriving step comprises obtaining values of a set of parameters (tc, ps, csd, qd, id, tpd, spd), where tc is a throughput class, ps is a packet size, csd is a cross switch delay, qd is a queuing delay, id is an insertion delay, tpd is a terrestrial propagation delay, and spd is a satellite propagation delay, and determining said number, N, based on a value of an expression:

(2*D*tc/ps), where
$D=(Ht+Hs+1)(csd)+Ht(qd+id+tpd)+Hs(qd+id+spd)$.

8. A method in accordance with claim 1 wherein said first packet includes a delay field, wherein said adding step comprises each of said ones of said first, intermediate, and second nodes, adding a one-way delay component associated with that node to said delay field, wherein said determining step comprises determining said number, N, based on a value of an expression:

(2*D*tc/ps), where D is a delay defined by said delay field, tc is a throughput class, and ps is a packet size.

9. A method in accordance with claim 1 wherein said first packet includes a delay field, wherein said adding step comprises each of said ones of said first, intermediate, and second nodes, adding a two-way delay component associated with that node to said delay field, wherein said determining step comprises determining said number, N, based on a value of an expression:

(D*tc/ps), where D is a delay defined by said delay field, tc is a throughput class, and ps is a packet size.

10. A method in accordance with claim 1 wherein said first packet is a call request packet to establish said packet connection for a virtual call.

11. A method in accordance with claim 1 wherein said first packet is a permanent virtual circuit setup packet to establish said packet connection for a permanent virtual circuit.

12. A method in accordance with claim 1 wherein said first packet is a reconnect request packet transmitted to establish said packet connection to replace a previously existing packet connection through said network.

13. In a packet switching arrangement comprising a plurality of packet switching nodes, a method of controlling packet flow comprising transmitting a first packet from a first one of said nodes to a second one of said nodes via intermediate ones of said nodes to establish a packet connection between said first node and said second node, ones of said first, intermediate, and second nodes adding delay data into said first packet, in response to a receipt of said first packet, said second node determining a window size for use over said connection based on said delay data added into said first packet, said determined window size comprising a number, N, of packets, after said determining step, said second node transmitting a second packet to said first node over said connection, said second packet defining said number, N, and after a receipt of said second packet, said first node transmitting packets to said second node over said connection such that, at any given time, no more than N packets transmitted by said first node are unacknowledged by said second node.

14. A method in accordance with claim 13 wherein said first packet includes a hop count field, wherein said adding step comprises incrementing said hop count field, and wherein said determining step comprises deriving said window size as a function of a number, H, of hops defined by said hop count field.

15. A method in accordance with claim 14 wherein said deriving step comprises obtaining values of a set of parameters (tc, ps, csd, qd, id, pd), where tc is a throughput class, ps is a packet size, csd is a cross switch delay, qd is a queuing delay, id is an insertion delay, and pd is a propagation delay, and determining said number, N, based on a value of an expression:

(2*D*tc/ps), where $D=(H+1)(csd)+H(qd+id+pd)$.

16. A method in accordance with claim 15 wherein said obtaining step comprises said second node determining said parameters tc and ps by communicating with terminal equipment coupled to said second node, and said second node determining said parameters csd, qd, id, and pd by reading a memory of said second node.

17. A method in accordance with claim 13 further comprising after said determining step, said second node transmitting packets to said first node over said connection such that, at any given time, no more than N packets transmitted by said second node are unacknowledged by said first node.

18. A method in accordance with claim 13 wherein said first packet includes a terrestrial hop count field and a satellite hop count field, wherein said adding step comprises incrementing one of said hop count fields, and wherein said determining step comprises deriving said window size as a function of a number, Ht, of terrestrial hops defined by said terrestrial hop count field and a number, Hs, of satellite hops defined by said satellite hop count field.

19. A method in accordance with claim 18 wherein said deriving step comprises obtaining values of a set of parameters (tc, ps, csd, qd, id, tpd, spd), where tc is a throughput class, ps is a packet size, csd is a cross switch delay, qd is a queuing delay, id is an insertion delay, tpd is a terrestrial propagation delay, and spd is a satellite propagation delay, and determining said number, N, based on a value of an expression:

$$(2*D*tc/ps),$$

where $$D = (Ht + Hs + 1)(csd) + Ht(qd + id + tpd) + Hs(qd + id + spd).$$

20. A method in accordance with claim 13 wherein said first packet includes a delay field, wherein said adding step comprises each of said ones of said first, intermediate, and second nodes, adding a one-way delay component associated with that node to said delay field, wherein said determining step comprises determining said number, N, based on a value of an expression:

$$(2*D*tc/ps),$$

where D is a delay defined by said delay field, tc is a throughput class, and ps is a packet size.

21. A method in accordance with claim 13 wherein said first packet includes a delay field, wherein said adding step comprises each of said ones of said first, intermediate, and second nodes, adding a two-way delay component associated with that node to said delay field, wherein said determining step comprises determining said number, N, based on a value of an expression:

$$(D*tc/ps),$$

where D is a delay defined by said delay field, tc is a throughput class, and ps is a packet size.

22. A method in accordance with claim 13 wherein said first packet is a call request packet to establish said packet connection for a virtual call.

23. A method in accordance with claim 13 wherein said first packet is a permanent virtual circuit setup packet to establish said packet connection for a permanent virtual circuit.

24. A method in accordance with claim 13 wherein said first packet is a reconnect request packet transmitted to establish said packet connection to replace a previously existing packet connection through said network.

25. In a packet switching arrangement comprising a plurality of packet switching nodes, a method of controlling packet flow over a packet connection from a first one of said nodes to a second one of said nodes via intermediate ones of said nodes, said method comprising in response to a receipt of a first packet from said first node via said intermediate ones of said nodes, wherein said first packet includes delay data added into said first packet by ones of said first, intermediate, and second nodes, said second node determining a window size for use over said connection based on said delay data added into said first packet, said determined window size comprising a number, N, of packets, and after said determining step, said second node transmitting packets to said first node over said connection such that, at any given time, no more than N packets transmitted by said second node are unacknowledged by said first node.

* * * * *

UNITED STATES PATENT AND TRADEMARK OFFICE
CERTIFICATE OF CORRECTION

PATENT NO. : 4,769,815

DATED : September 6, 1988

INVENTOR(S) : Mark G. Hinch, John B. Reid, William C. Wiberg

It is certified that error appears in the above-identified patent and that said Letters Patent is hereby corrected as shown below:

<u>IN THE CLAIMS</u>

Column 9, lines 34 and 35,
 "D=(Ht+Hs+1)(csd)+Ht(qd+id+tpd)+Hs(q-d+id+spd)" should be
 "D=(Ht+Hs+1)(csd)+Ht(qd+id+tpd)+Hs(qd+id+spd)";

Column 11, lines 23 and 24,
 "D=(Ht+Hs+1)(csd)+Ht(qd+id+tpd)+Hs(q-d+id+spd)" should be
 "D=(Ht+Hs+1)(csd)+Ht(qd+id+tpd)+Hs(qd+id+spd)".

Signed and Sealed this

Fifth Day of June, 1990

Attest:

HARRY F. MANBECK, JR.

*Attesting Officer*  *Commissioner of Patents and Trademarks*